March 8, 1932. C. CONE 1,848,161
PROCESS AND APPARATUS FOR FORMING AND ANNEALING SHEET GLASS
Filed Sept. 18, 1929
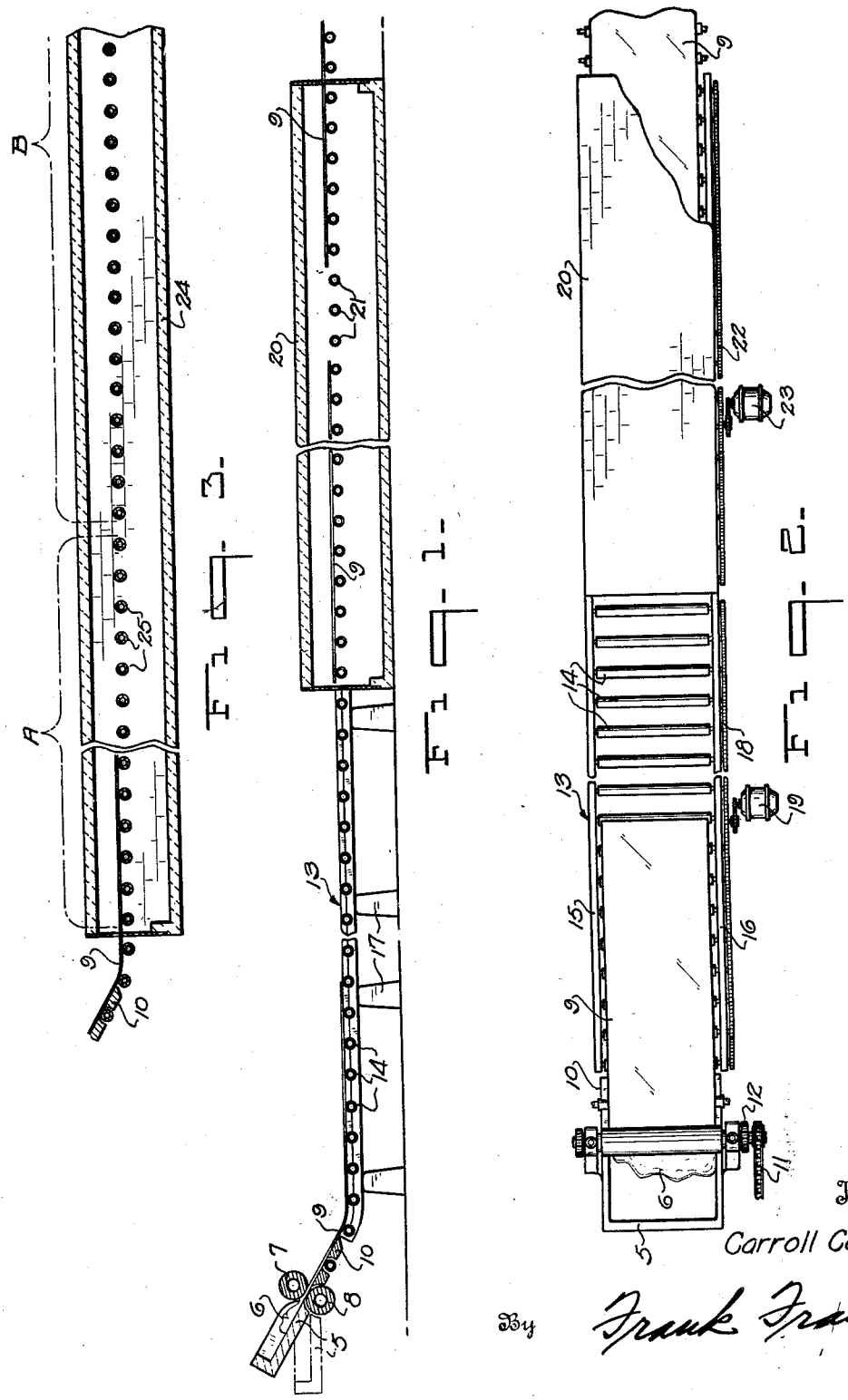
Inventor
Carroll Cone
By Frank Fraser
Attorney Patented Mar. 8, 1932

1,848,161

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING AND ANNEALING SHEET GLASS

Application filed September 18, 1929. Serial No. 393,554.

The present invention relates to an improved process and apparatus for forming and annealing sheet or plate glass.

According to the invention, a plurality of successive sheets of glass are adapted to be formed by an intermittent casting and rolling operation after which said sheets are gradually reduced in temperature by passing them through an annealing leer. It is desirable, in order to increase production and improve the quality of the glass sheets, that they be formed at a relatively high rate of speed such as for example, approximately sixty feet per minute, although this speed may be increased or decreased if preferred. A considerable length of time is ordinarily required to properly anneal the glass sheets and were the sheet carried entirely through the leer at the same high rate of speed at which it was formed, it will be apparent that the leer would necessarily have to be of considerable length. However, it is preferred, although not necessary, that the glass be kept in constant motion after being formed until it is properly annealed or at least until it has become substantially set.

The object of this invention, broadly stated, is in the provision of a process and apparatus wherein the glass sheets may be formed at a relatively high rate of speed and subsequently continuously annealed while traveling at a speed relatively less than its speed of formation. Thus, the process and apparatus herein provided will embody those advantages incident to the rapid reduction of the molten glass to sheet form and likewise, those advantages which result from slower annealing of the glass.

Another object of the invention resides in the provision of such a process and apparatus wherein successive sheets of glass are formed and carried continuously forwardly into and through an annealing leer, the glass sheet being caused to travel at variable speeds in such a manner as to prevent sagging of the sheet, thereby improving the quality of the glass and facilitating the annealing thereof.

Another object of the invention is in the provision of such a process and apparatus wherein the speed of travel of the sheet into and through the annealing leer is varied at predetermined intervals in such a manner that the forward end of each sheet formed will be closely adjacent the rear end of the preceding sheet as said sheets pass through the annealing leer, to the end that the leer may be utilized to its full capacity and thus eliminate large gaps between the sheets.

A further object of the invention is to provide such a process and apparatus wherein the glass sheet is formed at a relatively high rate of speed after which the speed of travel of the sheet is decreased to an intermediate speed during the remainder of the sheet forming cycle and then further decreased to an annealing speed, the sheet being passed through the annealing leer at an intermittent speed.

Other objects and advantages of the invention will become more apparent during the course of the following description when taken in connection with the accompanying drawings.

In the drawings forming a part of this application and wherein like numerals are employed to designate like parts throughout the same;

Fig. 1 is a vertical longitudinal section through apparatus provided by the present invention.

Fig. 2 is a top plan view thereof, and

Fig. 3 is a vertical longitudinal section of an alternate arrangement.

Referring to the drawings and particularly to Figs. 1 and 2, the numeral 5 designates a receiver or support for receiving thereupon a mass of molten glass 6 to be reduced to sheet form. The molten glass 6 is preferably deposited upon the receiver 5 when the same is in a substantially horizontal position as indicated by the broken lines in Fig. 1, after which said receiver is tilted to its full line position so that the molten glass will be moved therefrom between the substantially superimposed sheet forming rolls 7 and 8 which are spaced from one another to create a sheet forming pass therebetween. The glass sheet 9 issuing from between the forming rolls 7 and 8 is received upon an inclined runway 10 which functions to guide and support the sheet during its inclined downward travel. The forming rolls 7 and 8 serve to reduce the molten glass 6 to a sheet of substantially predetermined and uniform thickness and the space between the forming rolls determines the thickness of sheet produced.

It is desirable, as pointed out above, that the glass sheet be formed at a relatively high rate of speed and the forming rolls 7 and 8 are therefore rotated in a manner that their peripheral speed will be such that they will act to rapidly reduce the molten glass 6 to sheet form. One of the forming rolls is preferably positively driven such as through a chain drive 11 and the other forming roll is driven from the positively driven roll by means of intermeshing gears 12 carried by the roll shafts.

Positioned to receive the sheet 9 from the inclined runway 10 is a conveyor table 13 constituting a transfer section and which is composed of a plurality of horizontally arranged rolls 14 carried by shafts which are rotatably mounted within the side members 15 and 16 supported by the vertical uprights 17. The rolls 14 are adapted to be driven in unison at the same speed, and this may be accomplished in any preferred manner such as by keying to each roll shaft a sprocket (not shown) and training about the sprockets a sprocket chain 18 driven from a variable speed motor 19.

Arranged at the end of the transfer section 13 is a leer 20 within which are arranged a plurality of rolls 21 is horizontal alignment with rolls 14 of section 13. The rolls 21 are also adapted to be rotated in unison but independently of rolls 14 by the provision of a chain drive 22 driven from a variable speed motor 23.

In operation, the mass of molten glass 6 is first deposited upon the receiver 5 and subsequently passed to the forming rolls 7 and 8 which serve to reduce the glass to a sheet 9 of substantially predetermined and uniform thickness. During the formation of the sheet, the rolls 14 of transfer section 13 are being driven at a speed equal to the speed of the forming rolls 7 and 8. As the sheet issues from the rolling machine, it is received upon and travels over the rolls 14 until the head or forward end of the sheet reaches the end of the transfer section 13. The transfer rolls 14 and leer rolls 21 are then synchronized at an intermediate speed which is less than the rolling speed and just sufficient to carry the sheet off the transfer rolls during the remainder of the sheet forming cycle. As soon as the tail of the sheet leaves the section 13, said section is speeded up to receive the following sheet and at the same time the leer rolls are dropped to a very low speed, only fast enough to keep the sheet from acquiring a permanent deformation and are kept at this speed until it is again necessary to synchronize them with the transfer rolls to receive another sheet. In other words, the leer rolls are intermittently driven first at a high speed equal to the low speed of the transfer rolls and then at a slower annealing speed, while the transfer rolls are driven intermittently first at the rolling speed and then at a low speed equal to the high speed of the leer rolls. By the term "sheet forming cycle" is meant that time which is required from the beginning of the rolling of one sheet to the beginning of the rolling of the next sheet and this is usually approximately seven minutes.

While the present invention is not to be limited to any specific speeds set forth herein, the following example is given merely by way of illustration to render the invention more fully understood. For example, assuming:

| | |
|---|---|
| Sheet forming cycle | 7 minutes. |
| Rolling speed | 60 feet per minute. |
| Length of sheet | 100 feet. |
| Length of transfer section | 150 feet. |
| Rolling time | 2½ minutes. |
| Transfer speed | 22.2 feet per minute. |
| Transfer time | 4½ minutes. |
| Leer speed | 2 feet per minute. |
| Gap between sheets in leer | 5 feet. |

From the above example, it will be readily understood that if a glass sheet 100 feet in length was rolled at the rate of 60 feet per minute and carried forwardly at this speed, it would require 2½ minutes for the forward end of the sheet to reach the end of transfer section 13 which is 150 feet long. When the forward end of the sheet reaches the end of the transfer section, the speed of the transfer rolls 14 is reduced and the speed of the leer rolls 21 increased so that the said rolls are synchronized at the intermediate transfer speed of 22.2 feet per minute during the remainder of the cycle of seven minutes so that the transfer of the sheet into the leer will require 4½ minutes. After the sheet is entirely in the leer, the speed of the leer rolls 21 and consequently the movement of the sheet is reduced to preferably two feet per minute. With such an arrangement, the gap between adjacent sheets in the leer will be but five feet, whereas with a constant speed leer traveling at 22.2 feet per minute, the gap between the sheets would be 55.5 assuming the same general layout as above described were used. The intermediate speed is therefore highly desirable in that were the sheet carried along continuously through the leer at sixty feet per minute, the leer would have to be of very great length while, on the other hand, if the speed of the sheet were reduced from sixty feet per minute immediately to two feet per minute, a larger gap would be formed at the same minimum speed and there might also be a tendency for the sheet to sag before becoming substantially set. With the present invention, however, the sheet is kept at a comparatively high speed throughout the complete rolling cycle which gives several minutes for the glass to set before it is subjected to drastic changes in speed or is compelled to support its weight over the rolls at a very low speed. Also, large gaps between the sheets which would result in the leer from a continuously high leer speed are avoided without complicated selective control of the individual rolls. The layout above described may be made sufficiently flexible to permit a wide range of speeds.

The form of the invention illustrated in Fig. 3 is substantially the same as described hereinabove with the principal exception that the transfer section is also arranged within the leer. In other words, there is provided a leer 24 within which are arranged a large number of horizontally aligned rolls 25. The rolls 25 within the leer are divided into two units or sections A and B, the section A being the transfer section and B, the annealing section. Thus, the rolls of transfer section A are driven at the speed of formation of the sheet during the rolling thereof, after which the rolls of sections A and B are synchronized at an intermediate speed which is less than the rolling speed to effect the transfer of the sheet from section A onto the rolls of section B, after which the rolls of section B are dropped to a very low speed and kept at this speed until it is again necessary to synchronize them with the transfer rolls to receive another sheet therefrom.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass apparatus, sheet forming means, an annealing leer, and conveying mechanism for receiving the sheet from the forming means and carrying it into and through said leer including a transfer section, means for driving said section at variable speeds, an annealing section, and separate means for driving said annealing section at variable speeds.

2. The process of producing sheet glass, which consists in first forming the sheet at a predetermined rate of speed, in carrying the sheet forwardly into an annealing chamber and progressively decreasing the speed of travel thereof, and in annealing the sheet while causing it to travel through said chamber alternately at a relatively high speed and then at a relatively slower speed.

3. The process of producing sheet glass, which consists in first forming the sheet at a predetermined rate of speed, carrying the sheet forwardly at a speed equal to the speed of formation thereof, reducing the speed of travel of the sheet and feeding it at such reduced speed into an annealing chamber, again reducing the speed of travel of the sheet after it is received within the chamber, and in alternately increasing and then decreasing the speed of travel of the sheet during its passage through said chamber.

4. The process of producing sheet glass, which consists in forming a plurality of successive sheets of glass at predetermined intervals and at a relatively high rate of speed, carrying each sheet forwardly as it is formed into an annealing chamber, reducing the speed of travel of the sheet when it is received within the annealing chamber, and in then again increasing the speed of travel of the sheet to a speed relatively less than that of sheet formation during the transfer of each succeeding sheet formed into said annealing chamber.

5. The process of producing sheet glass, which consists in forming a plurality of successive sheets of glass at predetermined intervals and at a relatively high rate of speed, carrying each sheet forwardly after it is formed, reducing the speed of travel thereof and transferring it at such speed into an annealing chamber, again reducing the speed of travel of the sheet when it is received within the annealing chamber, and in then again increasing the speed of travel of the sheet to a speed equal to the intermediate speed during the transfer of each succeeding sheet formed into said annealing section.

6. The process of producing sheet glass, which consists in forming the sheet at a relatively high rate of speed and delivering it at such speed onto a conveying mechanism, reducing the speed of travel of the sheet when upon said conveying mechanism and transferring it at such reduced speed onto a second conveying mechanism, decreasing the speed of the second conveying mechanism when the sheet is received thereon and in increasing the speed of the first conveying mechanism, and in annealing the sheet while causing it to be carried forwardly upon said second conveying mechanism alternately at a relatively high speed which is equal to said transfer speed and then at a relatively slower speed.

Signed at Toledo, in the county of Lucas and State of Ohio, this 30th day of August, 1929.

CARROLL CONE.